United States Patent [19]

Johnson et al.

[11] Patent Number: 5,282,052
[45] Date of Patent: Jan. 25, 1994

[54] TECHNIQUES FOR AUTOMATIC FORM CREATION BY COMBINING PARTIAL OPERATIONS

[75] Inventors: Walter A. L. Johnson, Santa Clara; Stuart K. Card, Los Altos; Martin F. N. Cooper, Fremont, all of Calif.

[73] Assignee: Xerox Corporation, Stamford, Conn.

[21] Appl. No.: 856,107

[22] Filed: Mar. 20, 1992

[51] Int. Cl.⁵ .................. H04N 1/32; H04N 1/387; G06K 9/20
[52] U.S. Cl. .................. 358/402; 358/407; 358/440; 358/468; 358/450; 382/61
[58] Field of Search ............ 358/402, 440, 407, 468, 358/452, 450, 448; 382/61

[56] References Cited

U.S. PATENT DOCUMENTS

| | | | |
|---|---|---|---|
| 4,542,378 | 9/1985 | Suganuma et al. | 382/61 |
| 4,893,333 | 1/1990 | Baran et al. | 379/100 |
| 5,001,769 | 3/1991 | Reid-Green et al. | 382/61 |
| 5,051,779 | 9/1991 | Hikawa | 355/200 |
| 5,060,980 | 10/1991 | Johnson et al. | 283/70 |
| 5,099,340 | 3/1992 | Kamada et al. | 358/403 |
| 5,134,669 | 7/1992 | Keogh et al. | 382/61 |

FOREIGN PATENT DOCUMENTS

| | | | |
|---|---|---|---|
| 354703A2 | 2/1990 | European Pat. Off. | H04M 1/274 |
| 62-272751 | 11/1987 | Japan | H04N 1/32 |
| 63-95578 | 4/1988 | Japan | G06F 15/40 |
| 63-242060 | 10/1988 | Japan | H04N 1/21 |

OTHER PUBLICATIONS

DoveFax Installation and User's Manual, Dove Computer Corporation, Sep. 1990.

Primary Examiner—Stephen Brinich
Assistant Examiner—Scott A. Rogers

[57] ABSTRACT

An automatically created form includes a field for requesting a combined operation. A processor creates the form in response to another form that includes fields that are marked to indicate a sequence of partial operations. The partial operations together constitute the combined operation. The combined operation can, for example, be a facsimile transmission, in which case the partial operation fields can specify the digits of a fax machine's telephone number. The automatically created form can then include a single check box next to the name of the recipient. When the check box is marked, the processor responds to the form by performing the sequence of partial operations. The processor can execute input instructions to receive data defining the image of each form and can execute response instructions to respond to each form.

10 Claims, 10 Drawing Sheets

Speed Dial Form

Check Recipient :

New Fax Recipient

Name: *Sum Buddy*

Speed Dial Form

Check Recipient(s):

☐ *Sum Buddy*

☑ New Fax Recipient

Name: *Know Buddy*

```
0 ☐☐☐   0 ☐☒☐   0 ☐☐☐
1 ☒☐☐   1 ☐☐☐   1 ☐☐☐
2 ☐☐☐   2 ☐☐☒   2 ☐☐☐
3 ☐☐☐   3 ☐☐☐   3 ☐☐☐
4 ☐☐☒   4 ☐☐☐   4 ☒☒☒☒
5 ☒☐☐   5 ☐☐☐   5 ☐☐☐
6 ☐☐☐   6 ☐☐☐   6 ☐☐☐
7 ☐☐☐   7 ☐☐☐   7 ☐☐☐
8 ☐☐☐   8 ☐☐☐   8 ☐☐☐
9 ☐☒☐   9 ☐☐☐   9 ☐☐☐
```

Check ☐ If Recipients Are A New Group

Group Name: _____

*Fig. 4B*

Speed Dial Form

Check Recipient(s):

- ☑ (180) — Sum Buddy (182)
- ☑ (184) — Know Buddy (186)

☐ (172) New Fax Recipient

Name: _____ (174)

(176) 0-9 / 0-9 / 0-9 digit grid

Check ☑ (190) If Recipients Are A New Group

Group Name: Good Buddies (192)

Speed Dial Form

Check Recipient(s):

- 230 ☐ Sum Buddy — 232
- 234 ☐ Know Buddy — 236
- 244 ☐ Good Buddies — 246

222 ☐ New Fax Recipient

Name: _____ 224

226 { 0☐☐☐ 0☐☐☐ 0☐☐☐
     1☐☐☐ 1☐☐☐ 1☐☐☐
     2☐☐☐ 2☐☐☐ 2☐☐☐
     3☐☐☐ 3☐☐☐ 3☐☐☐
     4☐☐☐ 4☐☐☐ 4☐☐☐
     5☐☐☐ 5☐☐☐ 5☐☐☐
     6☐☐☐ 6☐☐☐ 6☐☐☐
     7☐☐☐ 7☐☐☐ 7☐☐☐
     8☐☐☐ 8☐☐☐ 8☐☐☐
     9☐☐☐ 9☐☐☐ 9☐☐☐ }

Check ☐ 240  If Recipients Are A New Group

Group Name: _____ 242

TECHNIQUES FOR AUTOMATIC FORM CREATION BY COMBINING PARTIAL OPERATIONS

BACKGROUND OF THE INVENTION

The present invention relates to forms from which a system obtains information for use in controlling subsequent operations of the system.

Johnson et al., U.S. Pat. No. 5,060,980, describe a form on which a user can impart or modify markings representing data. As shown and described in relation to FIG. 1, the markings are located so that a form interpreter can be instructed where to look for data to be read. The form can include printing, such as an outline of field regions to be filled in, borders, titles, and instructions. The form also includes encoded information representing a structural description of the form, including a description of the locations of fields on the form and a description of the types of fields. The encoded information can also include instructions for specific processing of selected data, dialing instructions to a facsimile machine, network addresses for routing selected data, data to be processed, etc. A system for processing such a form is shown and described in relation to FIG. 3, and a techniques for generating such a form are shown and described in relation to FIGS. 4 and 5. The user can view an image of the form, select or create fields and other items on the form, specify operations to be performed on contents of a field, and enter operations and data independent of the contents of any field.

SUMMARY OF THE INVENTION

One aspect of the invention deals with a basic inefficiency in the use of control sheets and other forms used to control machine operations. Such a form often includes a set of fields that can be used together to request an operation, with each field specifying a partial operation. For example, a telephone number to which a facsimile is transmitted can be specified with a series of fields, in each of which a user inserts a digit. Each time the same operation is requested, a number of fields must be completed.

This aspect is further based on the discovery of a technique that alleviates this problem. When a user specifies a sequence of partial operations on a form, the technique can automatically produce a new form with a single field to request a complete operation that includes the sequence of partial operations.

This technique can be implemented in a system that includes image input circuitry, image output circuitry, and a processor connected for receiving data defining images from the image input circuitry and for providing data defining images to the image output circuitry. The image input circuitry could be connected to receive facsimile transmissions, and the image output circuitry could be connected to provide facsimile transmissions.

The processor can receive first input image data defining an image of a first form with a number of fields that are marked so that they together indicate a sequence of partial operations. The indicated sequence constitutes a complete operation. The processor can use the data to automatically produce created form data defining an image of a second form that includes a field for indicating a request for the complete operation. The processor can provide the created form data to the image output circuitry. Then, the processor can receive second input image data defining an image of the second form that is marked to indicate a request for the complete operation. In response, the processor can perform the sequence of partial operations that constitutes the complete operation.

A machine implementing the invention can include, stored in memory, input instructions for receiving data defining an input form's image and response instructions for responding to an input form. In response to the first input image data, the processor can execute the response instructions to automatically produce the created form data. In response to the second input image data, the processor can execute the response instructions to perform the sequence of partial operations.

The invention can also be implemented by an article of manufacture for use in a system that includes a storage medium access device such as a floppy disk drive or a CD drive. The article can include a data storage medium such as a floppy disk or a CD-ROM and data stored by the medium. The stored data can indicate input instructions and response instructions as described above.

A closely related aspect of the invention is based on the recognition that a user may require some flexibility in obtaining an automatically created form. In the case where the user desires a form with a number of recipients, for example, the user may desire to add several recipients, then obtain a new form that lists all the added recipients.

This problem can be solved if one form specifies the partial operations that constitute the complete operation and another form requests the automatically created form for requesting the complete operation. This allows the user to obtain the automatically created form after adding a number of recipients, for example.

The following description, the drawings, and the claims further set forth these and other aspects, objects, features, and advantages of the invention.

BRIEF DESCRIPTION OF THE DRAWINGS

FIGS. 4A–4D are schematic diagrams of a series of fax control forms automatically produced by the techniques of FIGS. 1–3.

DETAILED DESCRIPTION

A. Conceptual Framework

Figure 1:
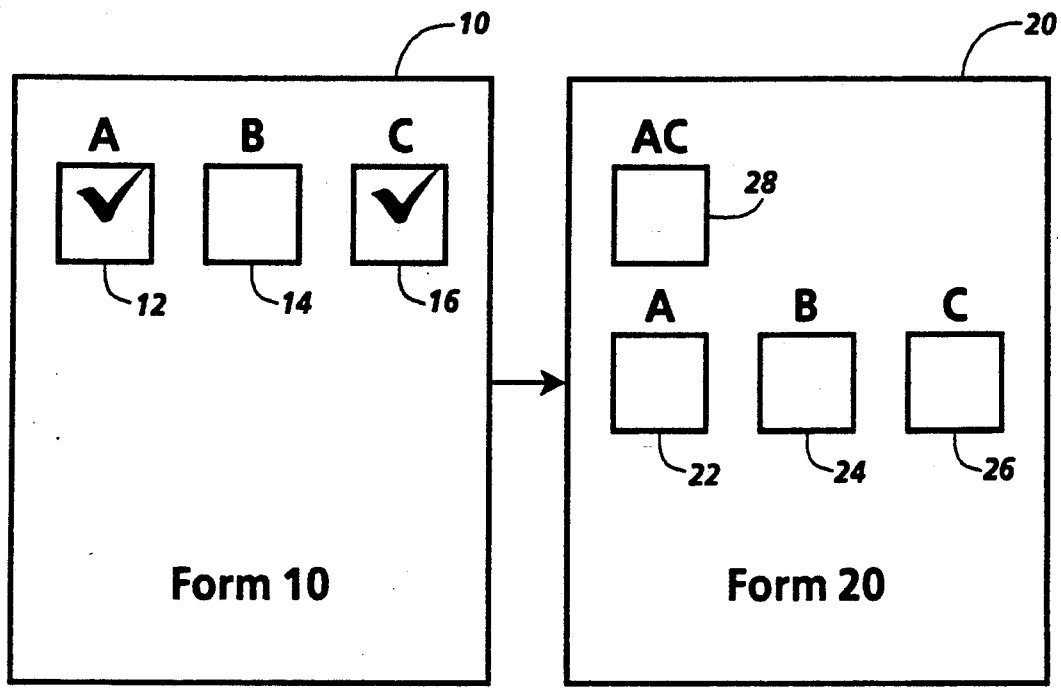
FIG. 1 is a schematic flow diagram showing how a first form specifying partial operations can be used to automatically produce a second form with a field for requesting a combined operation.

The following conceptual framework is helpful in understanding the broad scope of the invention, and the terms defined below have the indicated meanings throughout this application, including the claims.

The term "data" refers herein to signals that indicate or include information. When an item of data can indicate one of a number of possible alternatives, the item of data has one of a number of "values." For example, a binary item of data, also referred to as a "bit," has one of two values, such as "0" and "1" or "ON" and "OFF."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any arrangement of matter that can respond to first data at one location or time by providing second data at another location or time.

A "data storage medium" or "storage medium" is a physical medium that can store data. Examples of data storage media include magnetic media such as floppy disks, optical media such as CD-ROMs, and semiconductor media such as semiconductor ROMs and RAMs. As used herein, "storage medium" covers one or more distinct units of a medium that together store a body of data. For example, a set of floppy disks storing a single body of data would be a storage medium.

A "storage medium access device" is a device with circuitry that can access data on a data storage medium. Examples include floppy disk drives and CD-ROM readers.

"Memory" is any component, combination of components, circuitry, or system that can store data, and may include local and remote memory and input/output devices. An example of memory is a storage medium access device with a data storage medium that it can access.

A "data processing system" is a system that processes data. A "data processor" or "processor" is any component or system that can process data, and may include one or more central processing units or other processing components. A processor performs an operation or a function "automatically" when it performs the operation or function independent of concurrent human control.

Operations of a processor can be related to each other as "partial operations" and "complete operations" or "combined operations." A complete or combined operation is an operation that can be performed by performing a sequence of partial operations. A sequence of partial operations "constitutes" a complete or combined operation when the sequence is sufficient to perform the complete or combined operation.

Any two components are "connected" when there is a combination of circuitry that can transfer data from one of the components to the other.

A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data.

A processor "uses" data in performing an operation when the result of the operation depends on the value of the data.

An "instruction" is an item of data that a processor can use to determine its own operation. A processor "executes" a set of instructions when it uses the instructions to determine its operations.

An item of data "indicates" an attribute when the item has a value that depends on the existence of the attribute or on a measure of the attribute. For example, an item of data may indicate a set of instructions a processor can execute.

An item of data "includes" information indicating an attribute if data indicating the attribute can be obtained by operating on the item of data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An "image" is a pattern of light. An "image set" is a set of one or more images.

An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

An item of data "defines" an image set when the item of data includes sufficient information to produce all the images in the set.

A "data transmission" is an act that transmits data from one location to another. A "facsimile transmission" is a data transmission in which the transmitted data define an image according to a standard format. An "image destination" is a machine or other destination to which data defining an image can be transmitted. A "fax machine" is a machine with circuitry that can receive and provide facsimile transmissions. Therefore, the telephone number of a fax machine is an example of information that indicates an image destination.

A "marking medium" is a physical medium on which a human can produce a pattern of marks by performing marking actions or actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks.

A user "marks" a marking medium or "makes a mark on" a marking medium by performing any action that produces or modifies marks on the marking medium; a user may mark a marking medium, for example, with marking, erasing, wiping, or scratching actions.

The term "mark" includes a single mark and also plural marks that together form a pattern of marks.

The terms "form" and "field" are related: A marking medium may be an instance of a "form," in which case the marking medium has a set of "fields," each of which can be marked in an appropriate way to indicate information. A field may also include information indicating how it should be marked or indicating how a mark in the field is interpreted. For example, a field may include a "check box" indicating a region within which a check-like mark should be made. A field may include one or more fields within it. In addition to its fields, a form can include additional information such as machine-readable or human-readable information identifying the form.

A mark in a field "indicates" an attribute when the presence or shape of the mark depends on the existence of the attribute or on a measure of the attribute. A field is "for indicating" an attribute when one or more appropriate marks in the field would indicate the attribute. A field "indicates" an attribute when one or more marks in the field indicate the attribute.

One type of attribute that can be indicated by a mark in a field is a "request" for an operation, in which case presence of the mark indicates an action by a user intended to cause performance of the operation. For example, the field could include a check box for the mark and could also include information identifying the operation. An operation is performed "in response" to a field when the field is for indicating a request for the operation and a mark in the field indicating a request causes the operation to be performed.

Presence of a mark in a field could also indicate an action by a user intended to indicate an operation without indicating a request for the operation. For example, a mark could indicate an operation of signalling a digit of a telephone number, where signalling the digit is one of a sequence of operations that together perform the operation of obtaining a connection to a fax machine. The mark could be an instance of the digit itself or could be a mark in a check box that indicates the digit. A field "indicates a telephone number" when the marks in the field are sufficient to identify the operations that constitute signalling the telephone number.

An image "shows" a page, such as a page of a form or a sheet, when the image is an image of the page. An image set "shows" a page when the image set includes one or more images that, separately or in combination, show the page. Data "define" a page when the data define an image set that shows the page.

Data define an image that shows a "field that has been marked" or a "field that is marked" or a "field being marked" when the data define an image of the field that includes features that would be interpreted as one or more marks in the field if the defined image were interpreted according to a definition of a form that includes the field. Data define an image set that shows a "form that has been marked" or a "form that is marked" when the data define an image of the form that shows at least one field that has been marked. Therefore, data defining an image set that shows a form that has been marked can be produced in a number of ways: For example, a form on a marking medium can be marked by hand or by typing and then the form can be scanned or facsimile transmitted; or editing software can respond to user actions such as mouse and keyboard clicks by modifying data defining an image of the form so that it includes features that would be interpreted as marks.

An image "shows the contents of" a field that has been marked when the image shows the set of features that would be perceptible as marks in the field if the image were presented to a user.

An image is "from" a form when the image shows a part of the form or the form as a whole. For example, an image showing the contents of a field of a form is "from" the form.

A "version" of a first image is a second image produced using data defining the first image. The second image may be identical to the first image, or it may be modified by loss of resolution, by changing the data defining the first image, or by other processes that result in a modified version.

An operation "creates" a page, such as a page of a form or a sheet, when the operation produces data defining the page. An operation "transmits" a page when the operation transmits data defining the page.

B. General Features

Figure 2:
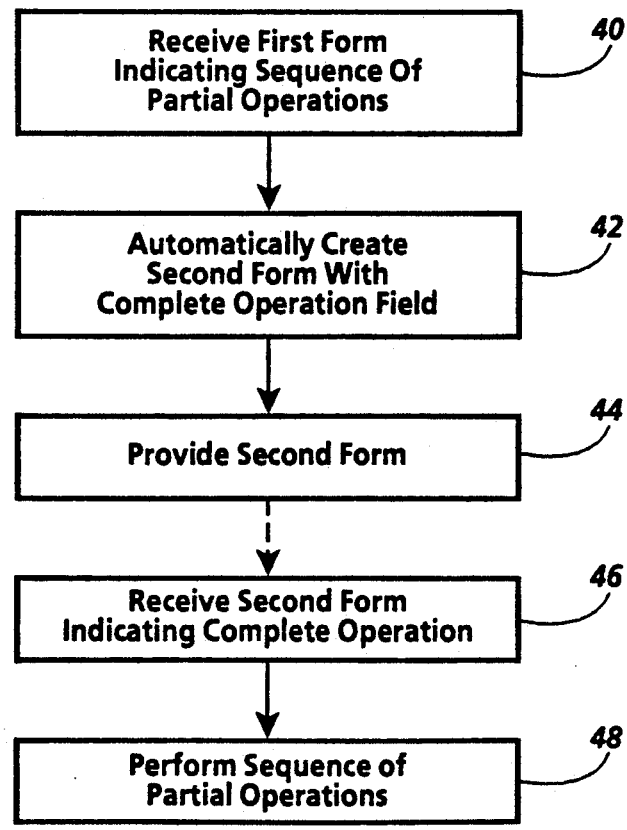
FIG. 2 is a flow chart showing general acts in automatically producing a form as in FIG. 1.
Figure 3:
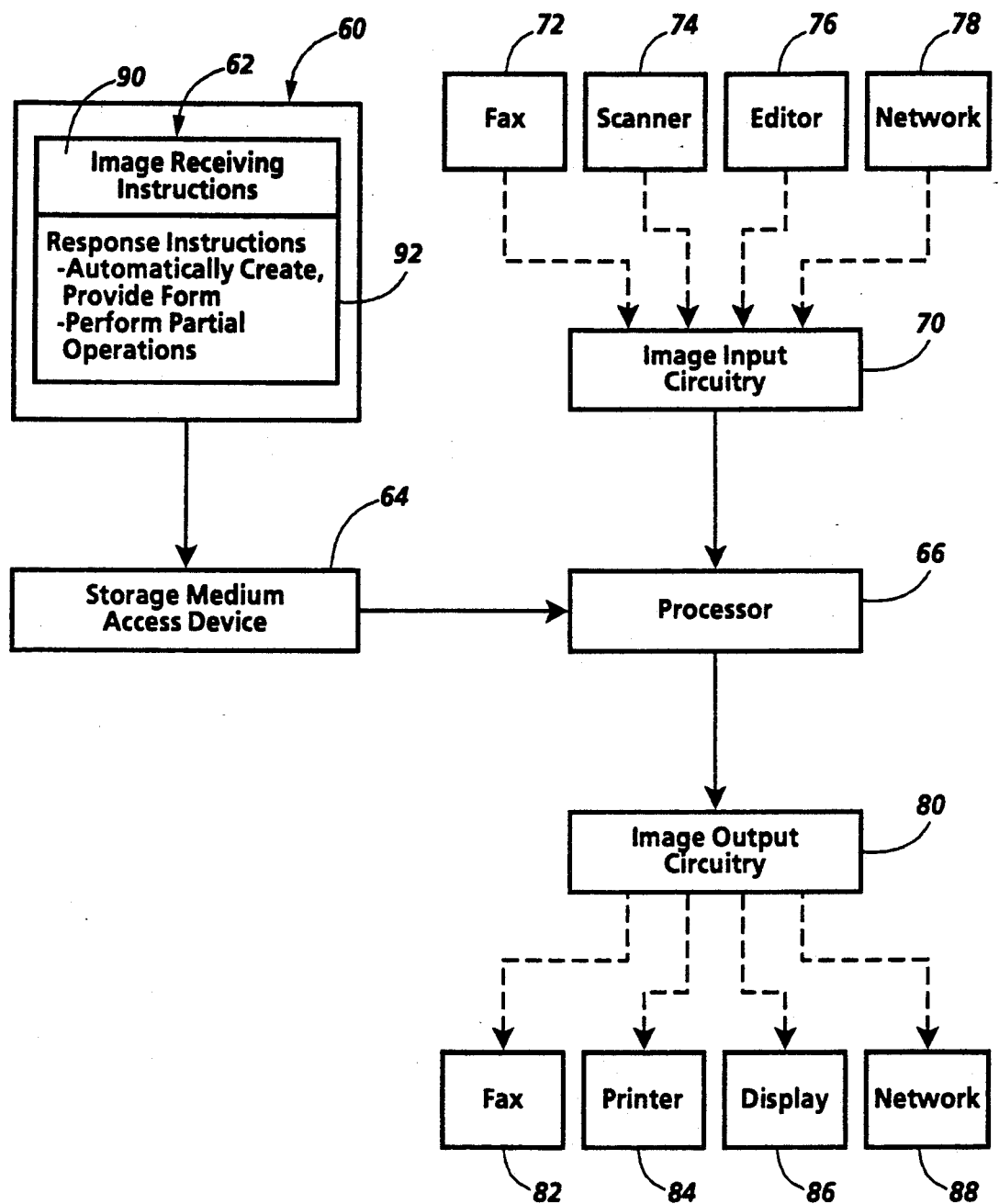
FIG. 3 is a schematic block diagram showing a software product that can be accessed by a system to automatically produce forms as in FIG. 2.

FIGS. 1-D illustrate general features of the invention. FIG. 1 is a schematic flow diagram showing how a first form specifying partial operations can be used to automatically produce a second form specifying a combined operation. FIG. 2 is a flow chart showing general acts in automatically producing a form as in FIG. 1. FIG. 3 is a schematic block diagram showing a software product that can be accessed by a system to automatically produce forms as in FIG. 2. FIGS. 4A-4D are schematic diagrams of a series of fax control forms automatically produced by the techniques of FIGS. 1-3.

Form 10 in FIG. 1 includes three partial operation fields, each for indicating a respective partial operation. Field 12 is for indicating partial operation A, field 14 partial operation B, and field 16 partial operation C. As shown, a user has inserted check marks in fields 12 and 16 to indicate a sequence that includes partial operations A and C. In response to form 10, form 20 is automatically produced. Like form 10, form 20 illustratively includes partial operation fields 22, 24, and 26 respectively for indicating partial operations A, B, and C. But form 20 also includes complete operation field 28 for indicating the complete operation constituted by the sequence of partial operations A and C. As a result, a user can more efficiently request the complete operation.

The act in box 40 in FIG. 2 receives data defining an image showing a first form in which partial operation fields are marked to indicate a sequence of partial operations, like form 10 in FIG. 1. The act in box 42 uses the data defining the first form to automatically create a second form that includes a complete operation field for indicating the complete operation constituted by the sequence of partial operations. The act in box 44 then provides data defining the second form as output.

As indicated by the dashed line leading to the act in box 46, the user may then optionally mark the second form so that the complete operation field is marked to indicate the complete operation. If so, the act in box 48 responds by performing the sequence of partial operations that constitutes the complete operation.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more floppy disks, an optical medium such as a set of one or more CD-ROMs, or any other appropriate medium for storing data.

Data storage medium 62 stores data that storage medium access device 64 can provide to processor 66. Processor 66 is connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

Processor 66 is also connected for providing data defining images to image output circuitry 80. The data could in turn be provided to fax machine 82, to printer 84, to display 86, or to network 88.

In addition to data storage medium 62, software product 60 includes data stored by storage medium 62. The stored data include data indicating image receiving instructions 90, which can be executed to perform the acts in boxes 40 and 46 in FIG. 2. The stored data also include data indicating response instructions, which can be executed both to automatically create and transmit a form as in boxes 42 and 44 in FIG. 2 and also to perform a complete operation by performing a sequence of partial operations, as in box 48.

FIGS. 4A-4D show images of forms resulting from an application of the invention to a fax machine. Some current fax machines have speed dialing buttons. A user can program a speed dialing button by providing a phone number to be associated with the button. After the button is programmed, activation of the button causes the fax machine to dial the associated number and transmit. Use of speed dialing buttons is limited, however, because a large number of steps are necessary to program a button and because the programming, once completed, is limited to a single machine. The technique illustrated in FIGS. 4A-4D provides a function similar to speed dialing that can be programmed through a small number of steps and that can be used on multiple fax machines.

Figure 4A:
Figure 4A:

In form 120 in FIG. 4A, field 122 is marked to indicate that a new fax recipient is being programmed. Field 124 is filled in with a name for the new fax recipient. Numerical grid 126 is filled in to indicate the new fax recipient's telephone number.

When the completed form 120 is received, form 140 in FIG. 4B is automatically created. Fields 142, 144, and 146 have the same respective functions as fields 122, 124, and 126 in FIG. 4A and have been filled in to request programming of another new fax recipient. In addition, field 150 allows a user to request the previous fax recipient with a single mark, and field 152 contains an image obtained from field 124 in FIG. 4A. If more than one recipient were checked, fields 160 and 162 could be completed to request a new group.

When the completed form 140 is received, form 170 in FIG. 4C is automatically created. Fields 172, 174, and 176 have the same respective functions as fields 122, 125, and 126 in FIG. 4A, but have been left blank. Field 180 has the same respective function as field 150 in FIG. 4B, with field 182 containing the image from field 124, and field 184 has been added, allowing the user to request the previous fax recipient with a single mark, field 186 containing an image obtained from field 144 in FIG. 4B. Fields 190 and 192 have the same respective function as fields 160 and 162 in FIG. 4B, but fields 180, 184, and 190 have been checked to indicate that a new group should be formed, and field 192 has been filled in with a name for the new group.

When the completed form 170 is received, form 220 in FIG. 4D is automatically created. Fields 222, 224, 226, 230, 232, 234, 236, 240, and 242 have the same respective functions as fields 172, 174, 176, 182, 184, 186, 190, and 192 in FIG. 4C. Fields 244 and 246 have been added, so that the user can request the new group of recipients with a single mark in field 244, with field 246 containing an image obtained from field 192 in FIG. 4C.

Each of the forms shown in FIGS. 4A-4D can be followed by a document to be transmitted to the indicated recipient or recipients. In each case, the user only needs to check a few boxes with a pencil and, if appropriate, write in a name or other mnemonic identifier in order to program the speed dial operation. The programmed information could be stored for access by multiple fax machines, any of which could then respond to each form.

The simple technique illustrated in FIGS. 4A-4D could be extended in various ways. For example, as each new recipient is added to the form, the list of recipients could be ordered based on frequency of transmission or some other criterion. Similarly, when the form becomes full, a second form could be created with the overflow or a recipient could be deleted to make room for a new recipient based on frequency or recency of transmission or some other criterion.

C. Implementation

The general features described above could be implemented in numerous ways on various machines. A current implementation runs on an IBM PC compatible machine (a "PC") with at least an 80386 microprocessor. The PC is equipped with a "fax card," meaning a combination of a board and software that enables the PC to transmit and receive facsimile images in a standard format, such as CCITT Group 3. The fax card could, for example, be SatisFAXtion TM from Intel Corporation; The Complete Communicator TM or The Complete Fax TM from The Complete PC, Inc.; or proFAX TM from Charter Electronics Industries Pte. Ltd. Because the current implementation is closely linked to a fax card, it is referred to herein as a "fax server."

1. General Fax Server Software Features

Figure 5:
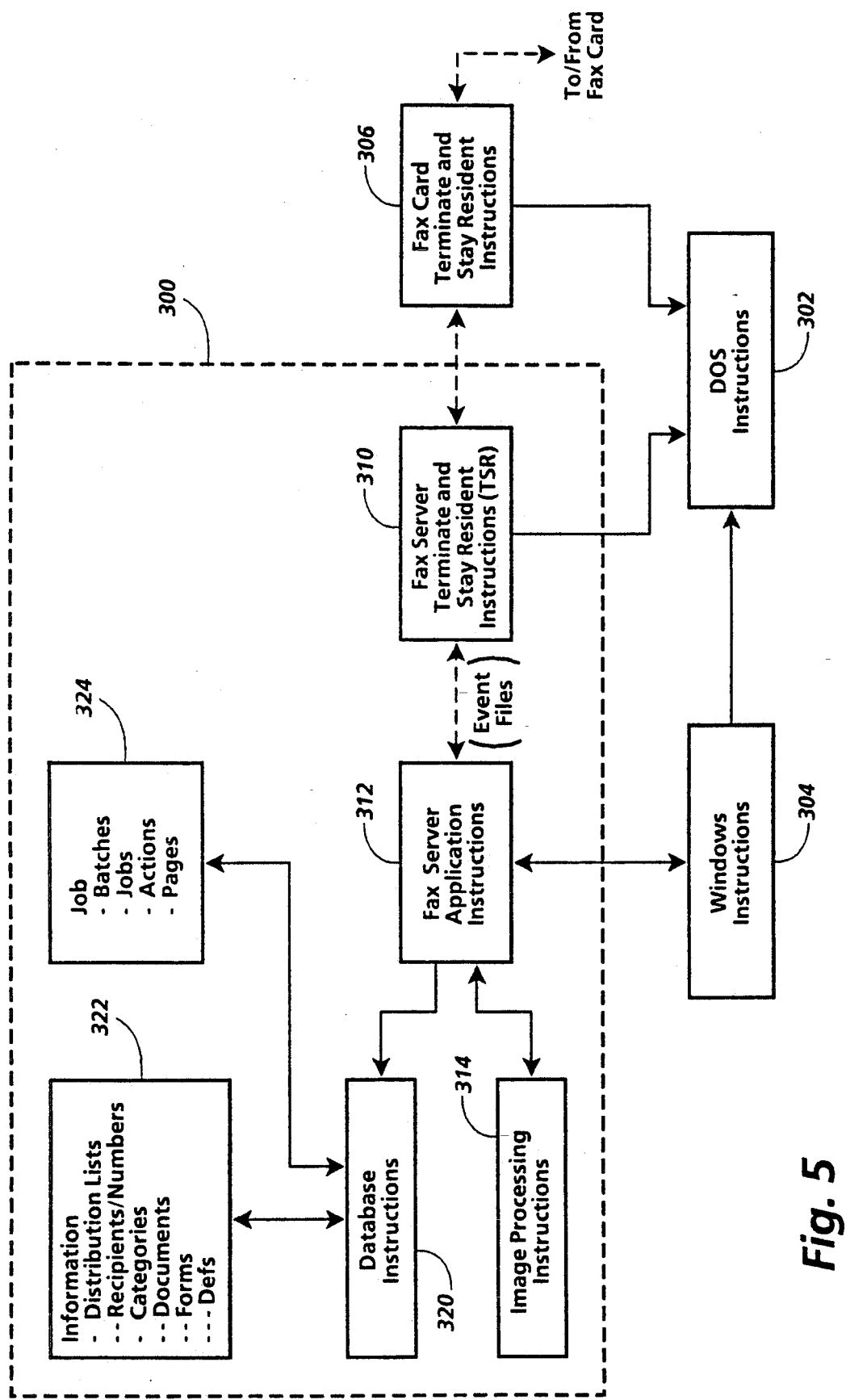
FIG. 5 is a schematic block diagram showing software components of a system that can automatically create a form with a field for requesting a combined operation.
Figure 6:
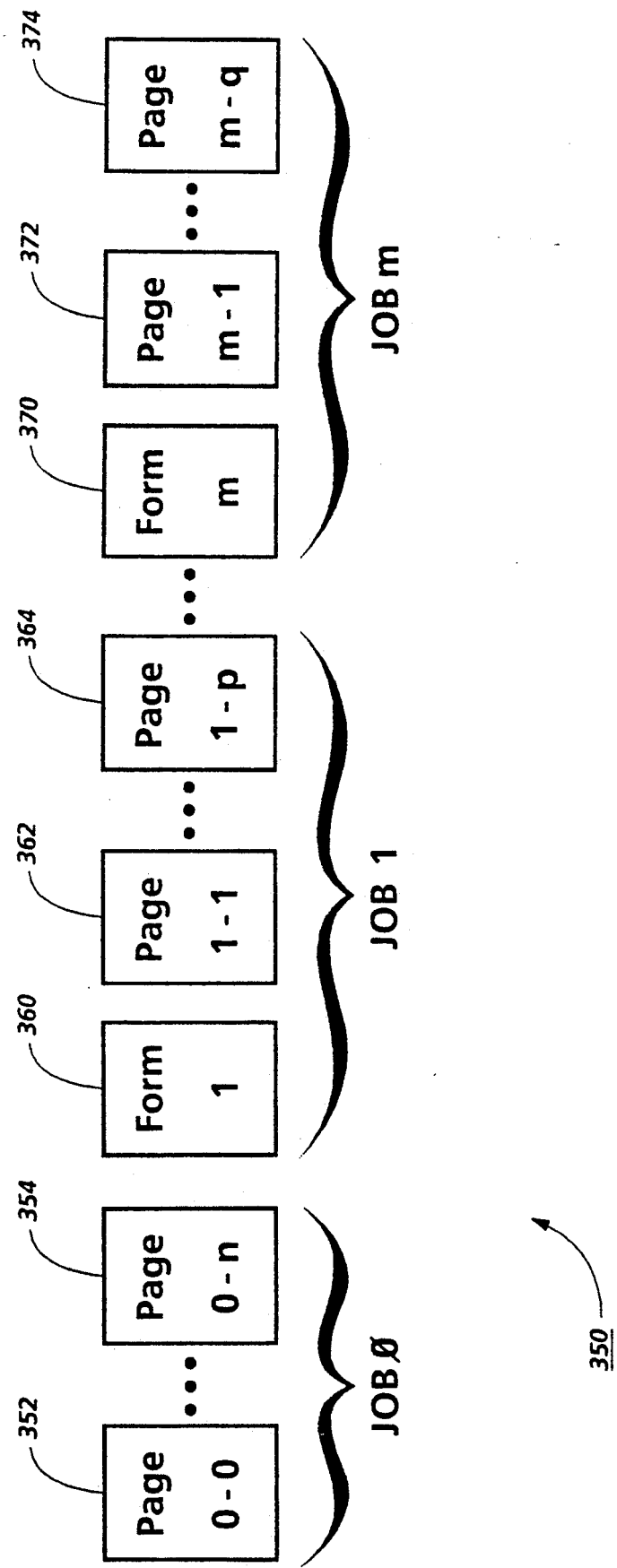
FIG. 6 is a schematic diagram showing a batch that can be handled by the components in FIG. 5.

FIG. 5 shows general software components of the current implementation. FIG. 6 illustrates the organization of a batch that is set up in response to a request from a user.

FIG. 5 shows general software components and some of the communication paths between components. Fax server software 300 includes instructions executed by a processor that is executing DOS instructions 302. In the current implementation, the processor is also executing at least the 3.0 version of Microsoft ®Windows TM, shown as windows instructions 304.

The communication path between fax server software 300 and the fax card goes through two DOS resident components, fax card terminate and stay resident instructions 306 and fax server terminate and stay resident instructions (TSR) 310.

For most fax cards, fax card terminate and stay resident instructions 306 can be installed when the fax card is installed. For each of these fax cards, fax server software 300 includes a respective TSR 310 that can be loaded when the user installs fax server software 300 in response to a signal from the user indicating the type of fax card.

Some fax cards, such as proFax, have a separate driver for programming. In these cases, the fax card is installed and TSR 310 is loaded during installation of fax server software 300.

Fax card terminate and stay resident instructions 306 and TSR 310 communicate to receive and send facsimile transmissions.

When a facsimile transmission is received, the fax card automatically stores the received data in a directory in the DOS filing system. When TSR 310 next polls fax card terminate and stay resident instructions 306, TSR 310 receives data indicating that a received transmission is in a file in the directory. In response, TSR 310 assigns an event number to the file and creates an event file. The event file includes the event number and other information, such as the DOS file name of the received file and the telephone number of the sending fax machine (or an empty identifier if a telephone number is not available).

When fax server application instructions 312 next poll TSR 310, TSR responds with the event number of the next unprocessed event file. Fax server application instructions 312 can then handle the received transmission as described below.

Similarly, before fax server application instructions 312 signal TSR 310 to send a facsimile transmission, they create an event file with the next available event number. This event file can include the event number, the telephone number of the destination, a temporary file number identifying a temporary file containing data to be transmitted, and such other information as a user name for a header on transmitted pages, and so forth.

In response to the event file, TSR 310 provides data to fax card terminate and stay resident instructions 306 indicating the destination. TSR 310 can temporarily save the items to be sent in a directory in the DOS filing system. Then fax card terminate and stay resident instructions 306 can put a request on a queue of requests to the fax card. Subsequently, in response to status checks from fax server application instructions 312, TSR 310 can request data from fax card terminate and stay resident instructions 306 indicating whether the items have been successfully sent.

Fax server application instructions 312 perform the central functions of fax server software 300. In addition to the above, fax server application instructions 312 also call image processing instructions 314 to perform image processing operations and database instructions 320 to manage data in information database 322 and job database 324. A user can interact with fax server application instructions 312 through windows instructions 304.

In the current implementation, database instructions 320 include the instructions of db—Vista TM, a commercial database product from Raima Corporation. Information database 322 and job database 324 are both implemented using db—Vista.

Information database 322 includes two lists, a list of distribution lists and a list of categories of documents and forms. Each list appears as a top level container within the user interface provided by windows instructions 304, and the user can set up new distribution lists and categories through the user interface. Each distribution list includes information about a set of recipients, including data identifying recipients and telephone numbers of their fax machines; one distribution list, named "All Recipients," includes all of the recipients. Each category of documents and forms includes a set of items, each of which is either a document or a form. For each document, the category includes a pointer to the name of the DOS file in which data defining the document is stored. For each form, the category includes a pointer to the name of the DOS file in which the definition or description of the form is stored.

Job database 324, on the other hand, acts as an automatic scheduler for processing a series of images. Job database 324 therefore includes data indicating any pending batches, jobs, actions, and pages, as described more fully below.

As can be understood from FIG. 5, fax server application instructions 312 can receive requests from a user through the user interface provided by windows instructions 304, based on a display and a user input device such as a keyboard and mouse. In the current implementation, these requests are received as a data structure indicating contents of a form. Fax server application instructions 312 can also receive user requests on forms in facsimile transmissions received by the fax card. Fax server application instructions 312 can respond to a request from either user interface by setting up a batch in job database 324.

FIG. 6 shows batch 350, which includes a series of m jobs, each of which includes data defining one or more images. The images are illustratively pages, such as pages of a facsimile transmission. Job 0 includes n pages, with pages 352 and 354 being the first and last respectively. Job 1 includes p pages, with the first, page 360, defining a form and with pages 362 and 364 being the second and last respectively. Similarly, the following jobs each begin with a form, as illustrated by the last job, with q pages beginning with page 370 defining a form and with pages 372 and 374 being the second and last respectively.

FIG. 6 illustrates several general features in the operation of job database 324 in the current implementation: A batch includes one or more jobs. Each job includes one or more pages. The first job in a batch may not begin with a form, but every job after the first begins with a form which may be followed by a set of pages. Each job thus includes one of the following: a single blank sheet; a number of non-form pages, also referred to as a document; a single form; a single form followed by a document.

The basic scheduling operation is a cycling operation that, on each cycle, selects an action to be performed from those currently existing in job database 324. The current implementation has a number of different types of actions, many of which may be used to handle a received facsimile transmission. An action of a given type may be "created," meaning that an instance of the type is set up in job database 324.

An action in job database 324 includes various items of information including data indicating the action's function and data that can be used in scheduling performance or execution of the action's function. The scheduling data includes the action's state, whether ready or done; the earliest time to start performing the action's function; a priority to ensure that a retrieve function will be completed before a send function; and, optionally, a special function called a readyproc to determine whether the action is ready for performance of its function.

The Input action is a default action whose function is performed when no other action is ready, based on a readyproc that checks whether other actions are ready. Therefore, job database 324 always includes an Input action. The Input action's function polls TSR 310 to obtain data indicating whether or not a facsimile transmission has been received. If so, the function obtains an event file for the newly received images, sets up a new batch in job database 324, and creates a Batch action.

The Batch action is created by an Input action, as described above. The Batch action's function calls a converter procedure that is appropriate for the fax card being used, as indicated by the user at the time fax server software 300 is installed; the converter procedures convert a received file from the fax card's format to a DOS file in fax server format; the DOS file name can be based on an integer identifier to facilitate communication between windows instructions 304 and TSR 310. Conversion can be performed by calls to modules that can be independently modified and extended. Conversion techniques are described in copending coassigned U.S. patent application Ser. No. 07/856,000, entitled "A System and Method for Storing Received Facsimile Image Data in Computer Memory," incorporated herein by reference.

The Batch action's function also creates, for each page in the received file, a page entry and a Page action to be performed on that page in job database 324; if only a single page is received, the function includes data in the page entry indicating a single page batch; the function also creates a Job Set action. The function also creates a Cleanup action.

The Page action is created by a Batch action, as described above. Each Page action has a respective page entry for storing data relating to the respective page.

If the page is a single page batch, the Page action's function calls image processing instructions 314 to determine whether the page is blank. Techniques for detecting a blank page are described in copending coassigned U.S. patent application Ser. No. 07/855,375, entitled "Identificaiton of a Blank Page in an Image Processing System," incorporated herein by reference. If the page is not blank or if the batch has more than one page, the function calls image processing instructions 314 to determine whether the page is a form or a data (non-form) page. Data indicating whether the page is a form or a data page is stored in the page entry; if the page is a form, data identifying the form is also obtained from the image and stored in the page entry.

If every form includes a distinctive registration mark such as a logo, image processing instructions 314 could first search for the logo and determine whether the page is a form using the result of the search. Then, if each form includes machine readable identifying information, the image processing instructions 314 could operate on data defining the image of the form to obtain identifying data identifying the form. Form identifying information could be encoded and included in the image in the manner described in copending coassigned U.S. patent application Ser. No. 07/560,514, now continued as application Ser. No. 07/931,554, entitled "Self-clocking Glyph Shape Coes," incorporated herein by reference.

The Job Set action is also created by the Batch action, as described above. The Job Set action has a readyproc that determines that it is ready when there are no pages in the batch whose type remains unknown, meaning that all Page actions for the batch have been completed. In accordance with FIG. 5, a job is created in job database 324 for each job in the batch. Each job is also added to an activity log that lists all jobs, transactions, and transmissions. If a job includes only a single blank sheet, the Job Set action converts an initial form called the "Starter Form," to the fax card format and creates a Retrieve action to transmit the converted Starter Form, as discussed in greater detail below. If a job begins with a form, a Form action is created for the job.

The Form action is created by the Job Set action, as described above. The Form action uses the data identifying the form from the page entry, as stored by the Page action, to access the form's definition from information database 322. The Form action then uses the form's definition to construct calls to image processing instructions 314.

A call to image processing instructions 314 can include data indicating a segment of the form's image, such as a rectangle, or a position within the form's image, such as a corner of a check box. Each call can also include data indicating an operation to be performed; examples include an operation that determines whether a segment has been marked and an operation that clips a segment that has been marked and returns its contents in the form of an array such as a bitmap.

The Form action uses the form's definition and the results returned by image processing instructions 314 to create actions and other items within job database 324. For example, the form definition can indicate that, if a given check box is marked, a Store action should be created to store a document in response to a Store form; or that a Delete action should be created to delete a document in response to a Delete form; or that a Pre-Send action should be created to prepare to provide a facsimile transmission in response to a Send form; or that a Pre-retrieve action should be created to prepare to provide a facsimile transmission to a destination indicated on the form or back to the fax machine that sent the form, typically in response to a Retrieve or List Contents form; and so forth.

When the Form action must obtain a destination for a Retrieve action, it begins by using a destination indicated on the form, such as a telephone number of a fax machine. If none is indicated, the Form action uses the telephone number in the current event file, indicating the fax machine from which the Retrieve action was requested. If none, the Form action leaves the destination blank.

As discussed in greater detail below for certain cases, the form's definition can indicate that a new form, a cover sheet, or another image should be automatically created, in which case the Form action obtains data defining the new form, cover sheet, or other image. If a new form is created, it is added to a special category called "All Forms."

The Store action can be created by the Form action, as described above, in response to a Store form that preccedes a set of one or more data pages. The Store action obtains a system identifier, such as a file location of the data pages, stores the system identifier in any categories indicated in check boxes on the form and, even if no categories are indicated, stores the system identifier in a special category called "All Documents." The Store action can also associate data defining an identifying image from the Store form with the system identifier in the manner described in copending, coassigned U.S. patent application Ser. No. 07/855,987, entitled "Method and System for Labeling a Document for Storage, Manipulation, and Retrieval," incorporated herein by reference.

The Delete action can be created by the Form action, as described above, in response to a Delete form that includes check boxes indicating a set of one or more documents. The Delete action deletes entries in information database 322 for the indicated documents and also deletes the files in which the pages of the documents are stored.

The Pre-Send action can be created by the Form action, as described above, in response to a Send form that includes check boxes indicating a request to provide a facsimile transmission to a set of one or more indicated recipients. The Pre-Send action converts the items to be transmitted, such as forms, cover sheets, and documents, from the fax server's format to the appropriate format for the fax card being used, and stores each converted item in a respective DOS file. Conversion techniques are described in copending coassigned U.S. patent application Ser. No. 07/856,000, entitled "A System and Method for Storing Received Facsimile Image Data in Computer Memory," incorporated herein by reference. For each indicated recipient, the Pre-Send action obtains data indicating a transmission path, such as a fax machine's telephone number.

If the recipient is a new recipient, the Send form includes check boxes indicating the recipient's transmission path. If the Send form also includes a check box requesting that the recipient be added to the recipient index, the Pre-Send action adds data indicating the recipient's transmission path to indicated distribution lists in information database 322 and, in any event, to a special distribution list called "All Recipients." The Pre-Send action can also associate data defining an identifying image from the Send form with the recipient's transmission path in the manner described in copending, coassigned U.S. patent application Ser. No. 07/855,987, entitled "Method and System for Labeling a Document for Storage, Manipulation, and Retrieval," incorporated herein by reference.

If the recipient is indicated by a check box, the Pre-Send action retrieves the recipient's transmission path data from information database 322. Similarly, if all recipients in a distribution list are indicated by a check box, the Pre-Send action retrieves each recipient's transmission path data.

In either case, the Pre-Send action creates a Send action for each recipient.

The Send action can be created by the Pre-Send action as described above. The Send action orders the DOS files containing items to be transmitted to the specified recipient into a single queue. The Send action submits a request to TSR 310 to send the DOS files in the queue to the specified recipient. The Send action concludes by creating a Verify action.

The Pre-Retrieve action can be created by the Form action, as described above, in response to any request for a facsimile transmission other than a Send form. Like the Pre-Send action, the Pre-Retrieve action converts the items to be transmitted to the appropriate format for the fax card being used, and stores each converted item in a respective DOS file. Then the Pre-Retrieve action creates a Retrieve action.

The Retrieve action can be created by the Pre-Retrieve action as described above. The Retrieve action obtains data indicating a transmission path as obtained by the Form action, either from a return address section on the form or from the data defining the received transmission. If the Form action did not obtain a destination, the Retrieve action fails. The Retrieve action orders the DOS files containing items to be transmitted to the destination into a single queue. The Retrieve action submits a request to TSR 310 to send the DOS files in the queue to the destination. Like the Send action, the Retrieve action creates a Verify action.

The Verify action can be created by the Send action or the Retrieve action, as described above. The Verify action submits a request to TSR 310 for data indicating the status of the facsimile transmission that resulted from the Send action or Retrieve action that created the Verify action. If the facsimile transmission has not yet completed, the Verify action resets its start time so that it will be performed again later. The fax card will redial according to its configuration, and if the fax card reports a failure, the Verify action reports the failure to the activity log before completing.

The Cleanup action can be created by the Batch action as described above. The Cleanup action has a readyproc that determines that it is ready to be performed only when all other actions associated with the Batch action that created it are completed. The Cleanup action deletes any temporary files created by the other actions associated with the Batch action.

Each cycle of the basic scheduling operation selects an appropriate action to be performed next. For example, if the only actions that are ready are a Batch action and its Cleanup action, the Batch action is selected and performed.

In addition to selecting an action to be performed next, each cycle of the basic scheduling operation branches based on whether a user interface action is waiting from the user interface provided by windows instructions 304. If so, a waiting user interface action is performed.

It would be straightforward to extend the current implementation to handle forms that request more than one type of operation or to handle a special form indicating a new recipient but not requesting a Send action. Similarly, it would be straightforward to extend the current implementation so that all the facsimile transmissions to a single destination from a single batch would be combined into a single continuous transmission rather than being transmitted independently.

2. Automatic Form Creation—New Recipient

Figure 7:
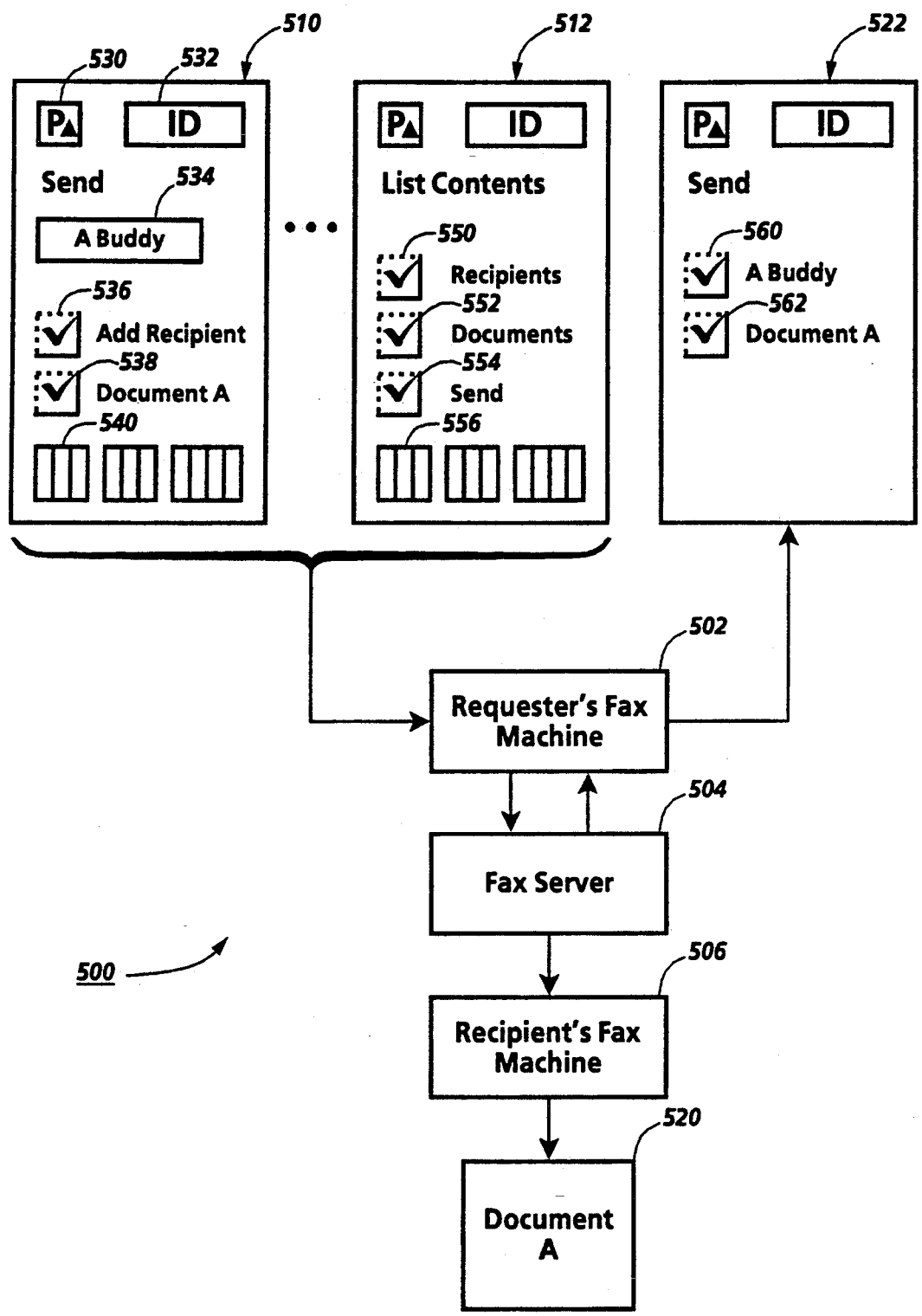
FIG. 7 is a schematic diagram showing input forms and a created form produced by a system that includes a fax server executing software like that in FIG. 5.
Figure 8:
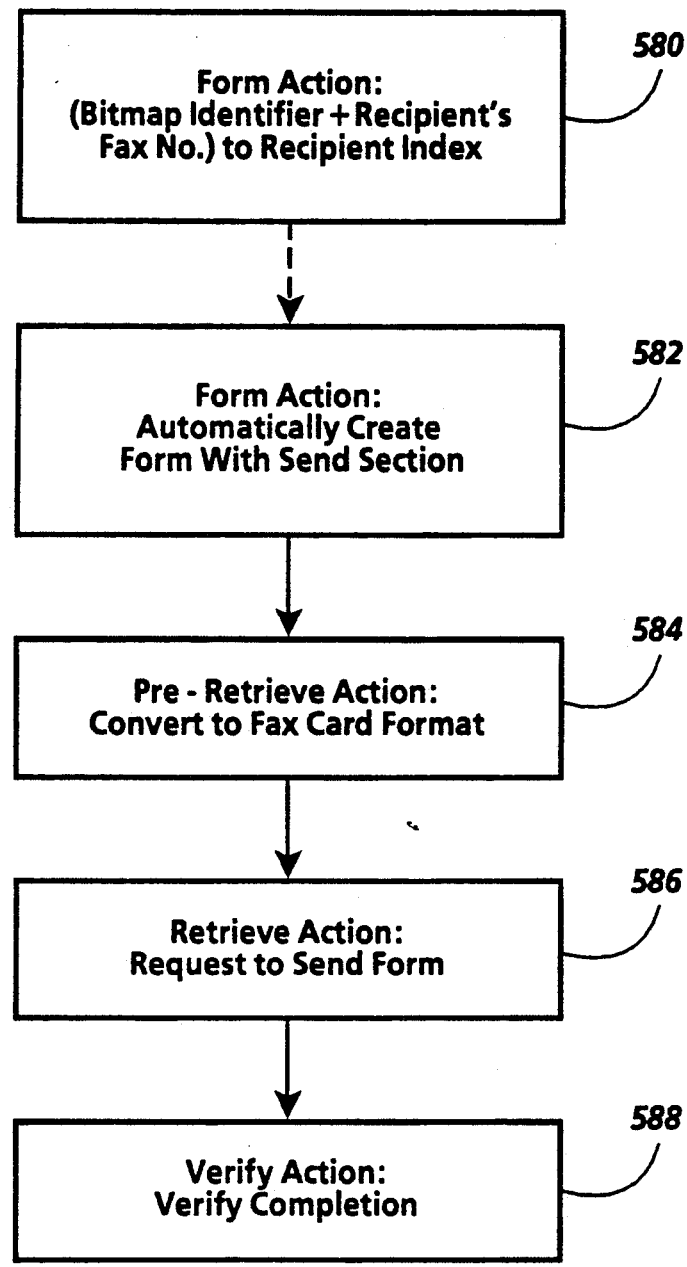
FIG. 8 is a flow chart showing acts in automatically creating a form with a field for requesting a combined operation in FIG. 7.

FIGS. 7 and 8 show how the general fax server features described above can be used to implement the invention. FIG. 7 illustrates schematically how a user can obtain automatic creation of a form showing a new recipient. FIG. 8 shows general acts performed by the fax server in automatically creating the form.

Network 500 in FIG. 7 includes requester's fax machine 502, fax server 504, and recipient's fax machine 506. Fax server 504 is running software like that described above in relation to FIGS. 5–6. As shown, the requester uses fax machine 502 to transmit data defining images of forms 510 and 512 to fax server 504. Forms 510 and 512 could be transmitted as part of a single batch or in separate batches. In response, fax server 504 transmits data defining an image of document A 520 to recipient's fax machine 506 and transmits data defining an image of form 522 to requester's fax machine 502.

Form 510 in FIG. 7 is a form that includes a Send section for requesting facsimile transmission of documents to recipients. Form 510, like the other forms shown, includes logo 530 for use in registration and to determine that it is a form. Form 510 also includes machine readable form identifying information, illustratively in a distinct field 532. The form identifying information could be encoded in the manner described in copending coassigned U.S. patent application Ser. No. 07/560,514, now continued as application Ser. No. 07/931,554, entitled "Self-clocking Glyph Shape Codes," incorporated herein by reference. Each form shown has its own unique identifying information, and this information can be generated at the time the form is created, based on a function of an identifier of the software installation that creates the form. In addition to the fields shown, each form can also have human readable name, data and time of creation, and other information.

A user can write a name or other mnemonic identifier of a recipient in field 534 in form 510. When a marked version of form 510 is received, data defining the contents of field 534, such as a bitmap, can be stored in information database 322 for subsequent use in performing the requested Send action and in automatic form creation. Copending coassigned U.S. patent application Ser. No. 07/855,987 entitled "Method and System for Labeling a Document for Storage, Manipulation, and Retrieval," incorporated herein by reference, describes ways of handling such bitmap images.

A user can mark boxes in fields 536, 538, and 540 in form 510 to further specify the requested operation. The box in field 536 is marked to specify that the recipient identified in field 534 should be added to the recipient index in information database 322. The box in field 538 is marked to specify that Document A should be sent to the recipient. Boxes in field 540 are marked to specify the recipient's fax number.

Form 512 in FIG. 7 is a form that includes a List Contents section that can be used for requesting facsimile transmission of an automatically created form back to the requester. List Contents sections are described in more detail in copending coassigned U.S. patent application Ser. No. 07/854,520, entitled "Using a Form to Request Automatic Form Creation," incorporated herein by reference.

A user can mark boxes in fields 550, 552, 554, and 556 to specify the requested operation. The box in field 550 is marked to specify that the automatically created form should include a list of all recipients in information database 322, which now includes the recipient identified in field 534 in form 510. The box in field 552 is marked to specify that the automatically created form should also include a list of all documents in information database 322. The box in field 554 is marked to specify that the recipients and documents should be listed in a Send section for requesting a send operation. Boxes in field 556 are marked to specify the requester's fax number or another number to which the automatically created form should be transmitted. The requester could thus indicate a fax number of another location or of a third party in field 556.

Form 522 in FIG. 7 is an automatically created form that includes a Send section as specified by the marked boxes in form 512. Like the other forms shown in FIG. 7, form 522 includes a logo and machine readable form identifying information, and can also include other machine and human readable information. A user can mark the boxes in fields 560 and 562 to specify a requested operation.

The user can mark the box in field 560 to specify that a facsimile transmission should be made to the recipient identified in field 534 in form 510. To assist the user in interpreting form 522, field 560 can also include a version of the image from field 534, identifying the recipient. In response to a mark in the box in field 560, fax server 504 can retrieve the identified recipient's fax number and use it to establish connection with recipient's fax machine 506.

The user can mark the box in field 562 to specify a document to be included in the fax transmission to the recipient. In response to a mark in the box in field 562, fax server 504 can retrieve and transmit data defining an image of the specified document from its DOS file, as illustrated by document A 520, thus completing the requested operation.

For simplicity of illustration, new form 522 includes only one field for selecting a recipient, field 560, and only one field for selecting a document, field 562. In general, an automatically produced form could include as many fields as will fit within the space available. If a request for automatic form creation exceeds the space available, fax server 504 can create one or more additional new forms for the overflow.

FIG. 8 illustrates acts performed by fax server 504 in producing new form 522. Each act is an action of one of the types described above.

The act in box 580 is a Form action that responds to form 510 by modifying the recipient index in information database 322. As shown, the recipient index is modified so that it can be used to retrieve the recipient's bitmap identifier from field 534 in form 510 and the recipient's fax number from field 540 in form 510. These items can be accessible as described in copending coassigned U.S. patent application Ser. No. 07/855,987 entitled "Method and System for Labeling a Document for Storage, Manipulation, and Retrieval," incorporated herein by reference. As a result, a system identifier is set up that can be used to access one or both of the recipient's bitmap identifier and the recipient's fax number. This system identifier is included in the special category All Recipients in the recipient index.

The act in box 582 is another Form action that responds to form 512 by automatically creating form 522 with a Send section that includes a listing of the contents of the All Recipients category. This Form action also creates a Pre-Retrieve action.

The act in box 584 is the Pre-Retrieve action created by the Form action in box 582. The Pre-Retrieve action converts the automatically created form to the appropriate format for the fax card being used. The Pre-Retrieve action also creates a Retrieve action.

The act in box 586 is the Retrieve action created by the Pre-Retrieve action in box 584. The Retrieve action submits a request to TSR 310 to send the converted form to the destination indicated in field 556 of form 512. The Retrieve action also creates a Verify action.

The act in box 588 is the Verify action created by the Retrieve action in box 586. The Verify action verifies successful completion of facsimile transmission of the converted form to the destination.

A form like form 522 in FIG. 7 could be created in many ways. In the current implementation, each automatically created form has an upper segment with a logo, a title, and machine readable form identifying information. Below this portion, an automatically created form with a Send section can include a recipient listing segment, a write-in recipient segment, an options segment, and a cover note segment. Alternatively, it could include a write-in recipient segment, a documents segment, an options segment, and a cover note segment. At the bottom of each automatically created form is a segment with the user's name and a date.

A recipient listing segment includes a set of fields like field 560 in form 522, each including a box that can be checked to request transmission to a distribution list or recipient and an identifier of the distribution list or recipient. These fields can be arranged in a number of columns across an image. The check box in each field can be implemented for detection as described in copending coassigned U.S. patent application Ser. No. 07/855,984 entitled "Mark Sensing on a Form," incorporated herein by reference.

A write-in recipient segment includes fields similar to fields in form 510. A field with a rectangular outline like field 534 permits a user to write a name or other identifying mnemonic of a new recipient. A field like field 536 includes a box that can be checked to request that the new recipient be added to the recipient index as described above. A field like field 540 includes boxes that can be checked to indicate the new recipient's fax number, together with instructions and a small-scale example.

A document segment includes a set of fields like field 562 in form 522, each including a box that can be checked to indicate a document and an identifier of the document. These fields can be arranged in a number of columns across an image and the check boxes can be implemented for detection as described above.

An options segment similarly includes a set of fields, each including a box that can be checked to indicate an optional operation. For example, a user can request a copy of a transmitted document be sent to the user's in basket, that the transmission be done at a prespecified time such as a time when telephone rates are cheaper, or that a cover sheet showing all recipients be automatically created and transmitted.

The cover note segment includes a field with a rectangular outline, permitting a user to write a cover note for an automatically created cover sheet. Automatic creation of a cover sheet including such a note is described in copending coassigned U.S. patent application Ser. No. 07/855,388 entitled "Using an Image from a Form in Automatic Creation of a Form or Sheet," incorporated herein by reference.

In creating a form, fax server 504 also produces an identifier of the form and creates a definition of the form. The identifier of the form is used to produce machine readable form identifying information and is also included in a list of forms in information database 322. A definition of each form is also stored such that each form's identifier can be used to obtain its definition.

The form definitions could be implemented in many ways. In the current implementation, the form definition indicates the type of each segment of the form, such as Send, Retrieve, List, Delete, and Store. Each type of form section has a respective set of segments, and the form description also indicates the type, location, size, and contents of each segment. Each segment can, in turn, contain a set of smaller segments, and the form description indicates for each smaller segment its type, its location, its size, and its contents. The types of sections of a form and of their segments are also used to determine how to retrieve and operate on the forms contents.

When a form is automatically created, it can be transmitted to the requested fax number. The fax number could be modified if necessary as described in copending coassigned U.S. patent application Ser. No. 07/856,005, now issued as U.S. Pat. No. 5,241,589, entitled "A System and Method for Implementing Telephone Dialing Rules," incorporated herein by reference.

D. Applications

The invention could be applied in many other ways other than in a system that performs facsimile transmissions. In general, the invention could be applied to any system in which images of forms can be transmitted, such as a system that includes a scanner and a printer.

The invention could be applied to document filing, in which a sequence of partial operations to access a directory pathway could be combined into a single request field on an automatically created form.

The invention could be applied to routing of documents within an electronic mail system or other network. For instance, a sequence of partial operations to send a document to a particular location could be combined into a single request field on an automatically created form.

The invention could also be applied to image processing operations. For instance, a sequence of partial operations on a document could be combined into a single request field on an automatically created form, including such operations as removing noise, deskewing, extracting specified types of regions, producing a copy of the document, producing a cover sheet describing the document, and so forth.

The invention could also be applied to set up copier jobs in response to a form. For example, the first time a user requests a complex copier job, the user would mark a form to indicate a sequence of partial operations that make up the job, including, for example, whether the copies should be on one or two sides, whether the copies should be stapled, and so forth. In response, the copier could produce a burst sheet for the job. This sheet can include machine-readable information indicating the sequence of partial operations. The burst sheet can be a form that includes a check box for requesting the same job set up or a field for specifying a number of copies to be made. The burst sheet can also include a human-readable summary of the specified partial operations and an identifier of the copied document, such as a reduced version of an image of the first page.

These other application of the invention could include extensions of the implementations described above.

For example, in the above description, a sequence of partial operations is indicated by checking a sequence of telephone numbers. Another way would be to write a sequence of numbers in which each number indicates an operation, such as by writing the digits of a telephone number. Yet another way would be to write a number next to a name of each partial operation, the numbers indicating the sequence in which the partial operations are to be performed; this technique could be implemented by including in each field a box for writing a number and a description or identifier of the field's respective operation.

Also, in the above description, a user could write a name of a recipient in a field, in which case an image of the name would appear on the automatically created form in a field for requesting a combined operation. If the combined operation is not a transmission to a recipient, the user could write another type of identifier, such as words describing the combined operation.

E. Miscellaneous

The invention has been described mainly in relation to implementations in which a form is produced requesting a facsimile transmission. The invention might also be implemented to produce various other types of forms. The invention is not limited to forms related to fax machines, although it is especially useful for such forms.

The invention has been described mainly in relation to implementations that transmit images of forms on paper sheets. The invention might also be implemented with forms on media other than paper, and with forms that are not on sheets as such, but on other types of marking media. For example, the invention might be implemented with a form on a marking surface on which a user can make marks that are electronically scanned.

The invention has been described in relation to software implementations, but the invention might be implemented with specialized hardware.

The invention has been described in relation to a software product that can be run on a personal computer with a fax card to provide fax services. In addition to the specific personal computer described, the invention could be implemented on any other personal computer, workstation, fax machine, or other system with suitable processing capabilities. In addition to the specific fax cards described, the current implementation could be extended to support other fax cards that can run in the Microsoft Windows environment and that have a programmable interface. In addition, the invention could be implemented with any other fax card or similar device for receiving and transmitting images, provided it has suitable processing capabilities. The invention could also be implemented in a dedicated server that provides fax services.

The invention has been described in relation to an implementation that also includes a user interface with a display and user input device such as a keyboard with a mouse. The user interface could be used to edit an automatically created form or to personalize a user profile to provide parameters used during automatic form creation. For example, a user could personalize the profile to indicate how fields appear within the segments of the automatically created form.

The invention has been described in relation to implementations in which a user can request automatic form creation using one or two forms. A larger number of forms could be used to indicate a sequence of partial operations that constitute a complete operation and to request automatic form creation.

The invention has been described in relation to check boxes that are rectangular or two-sided, but any other appropriate type of marking field could be defined on a form, including a field defined by parentheses, a field defined by shading, and a field of any appropriate shape.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method of operating a system that includes:
   image input circuitry for obtaining data defining images as input;
   image output circuitry for providing data defining images as output;
   a processor connected for receiving data defining images from the image input circuitry and for providing data defining images to the image output circuitry;
   the method comprising:
   operating the processor to receive first input image data from the image input circuitry; the first input image data defining a first image set, the first image set showing a first form; the first form including plural partial operation fields, the partial operation fields being marked to indicate together a sequence of partial operations that constitutes a complete operation;
   operating the processor to use the first input image data to automatically produce created form data and to provide the created form data to the image output circuitry; the created form data defining a second image set, the second image set showing a second form; the second form including an operation request field, the operation request field being for indicating a request for the complete operation;
   operating the processor to receive second input image data from the image input circuitry; the second input image data defining a third image set, the third image set showing the second form with the complete operation field being marked to indicate a request for the complete operation; and
   in response to the second input image data, operating the processor to perform the sequence of partial operations that constitutes the complete operation.

2. The method of claim 1 in which the first form further includes a form request field indicating a request for the second form; the act of operating the processor to use the first input image data being performed in response to the form request field.

3. The method of claim 1, further comprising the act of operating the processor to receive third input image data from the image input circuitry; the third input image data defining a fourth image set, the fourth image set showing a third form; the third form including a form request field that is marked to indicate a request for the second form; the act of operating the processor to use the first input image data being performed in response to the form request field.

4. The method of claim 1 in which the first form is further marked to indicate a request to perform the sequence of partial operations; the method further comprising, in response to the first input image data, the act of operating the processor to perform the sequence of partial operations.

5. The method of claim 1 in which the image output circuitry is connected to provide a facsimile transmission, the plural partial operation fields of the first form being marked to indicate a telephone number of a recipient to which a facsimile transmission can be made; the complete operation field of the second form including a check box and an identifier of the recipient; the second input image data defining the second form's image with the check box being marked; the act of operating the processor to perform the sequence of partial operations comprising the act of providing data defining an image for facsimile transmission to the telephone number indicated by the plural partial operation fields.

6. The method of claim 1 in which the image output circuitry is connected to provide a facsimile transmission, the first form further including a second number requesting field indicating a telephone number to which a facsimile transmission of data defining the second form is requested; the act of operating the processor to use the first input image data to automatically produce created form data and to provide the created form data to the form output circuitry comprising the act of providing the created form data for facsimile transmission to the telephone number indicated by the number requesting field.

7. A system comprising:
   image input circuitry for obtaining data defining images as input;
   image output circuitry for providing data defining images as output;
   memory for storing data; and
   a processor connected for receiving data defining images from the image input circuitry and for providing data defining images to the image output circuitry; the processor further being connected for accessing the memory;
   the data stored in the memory comprising:
      image receiving instruction data indicating input instructions the processor can execute to receive input image data from the image input circuitry; the input image data defining an image set; and
      operation performing instruction data indicating response instructions the processor can execute to perform operations in response to input image data;
   when the input image data define a first image set that shows a first form that includes plural partial operation fields that are marked to indicate together a sequence of partial operations that constitutes a complete operation, execution of the response instructions causing the processor to use the input image data to automatically produce created form data and to provide the created form data to the image output circuitry; the created form data defining an image of a second form; the second form including a complete operation field, the complete operation field being for indicating a request for the complete operation;
   when the input image data define a second image set that shows the second form and the complete operation field is marked to indicate a request for the complete operation, execution of the response instructions causing the processor to perform the sequence of partial operations that constitutes the complete operation.

8. The system of claim 7 in which the image input circuitry is connected for receiving facsimile transmissions.

9. The system of claim 7 in which the image output circuitry is connected for providing facsimile transmissions.

10. An article of manufacture for use in a system that includes:
   image input circuitry for obtaining data defining images of forms as input;
   image output circuitry for providing data defining images of forms as output;
   a storage medium access device for accessing a medium that stores data; and
   a processor connected for receiving data defining images from the image input circuitry and for providing data defining images to the image output circuitry; the processor further being connected for receiving data from the storage medium access device;
   the article comprising:
   a data storage medium that can be accessed by the storage medium access device when the article is used in the system; and
   data stored by the data storage medium so that the storage medium access device can provide the stored data to the processor when the article is used in the system; the stored data comprising:
      image receiving instruction data indicating input instructions the processor can execute to receive input image data from the image input circuitry; the input image data defining an image set; and
      operation performing instruction data indicating response instructions the processor can execute to perform operations in response to input image data;
   when the input image data define a first image set that shows a first form that includes plural partial operation fields that are marked to indicate together a sequence of partial operations that constitutes a complete operation, execution of the response instructions causing the processor to use the input image data to automatically produce created form data and to provide the created form data to the image output circuitry; the created form data defining an image of a second form; the second form including a complete operation field, the complete operation field being for indicating a request for the complete operation;
   when the input image data define a second image set that shows the second form and the complete operation field is marked to indicate a request for the complete operation, execution of the response instructions causing the processor to perform the sequence of partial operations that constitutes the complete operation.

* * * * *